United States Patent
Satchwell et al.

(10) Patent No.: US 6,840,712 B2
(45) Date of Patent: Jan. 11, 2005

(54) THERMAL REMEDIATION PROCESS

(75) Inventors: Robert Merton Satchwell, Sherwood Park (CA); Roderick Michael Facey, Edmonton (CA)

(73) Assignee: Hood Environmental Engineering, Ltd., Sherwood Park (CA)

( * ) Notice: Subject to any disclaimer, the term of this patent is extended or adjusted under 35 U.S.C. 154(b) by 0 days.

(21) Appl. No.: 10/336,648

(22) Filed: Jan. 3, 2003

(65) Prior Publication Data

US 2003/0228196 A1 Dec. 11, 2003

Related U.S. Application Data

(60) Provisional application No. 60/346,251, filed on Jan. 3, 2002.

(51) Int. Cl.[7] .............................. B09C 1/06; A62D 3/00
(52) U.S. Cl. ...................... 405/128.8; 37/351; 588/251
(58) Field of Search ......................... 405/128.55, 128.8, 405/130; 37/351; 588/251

(56) References Cited

U.S. PATENT DOCUMENTS

| | | | |
|---|---|---|---|
| 4,139,462 A | 2/1979 | Sample, Jr. ................. | 210/774 |
| 4,738,206 A | 4/1988 | Noland ....................... | 110/346 |
| 4,917,023 A | 4/1990 | Jones ......................... | 110/230 |
| 4,951,417 A | 8/1990 | Gerken et al. ............... | 47/1.42 |
| 5,041,209 A | 8/1991 | Cha et al. ............... | 208/251 R |
| 5,178,077 A | 1/1993 | Norris et al. ............... | 110/347 |
| 5,188,041 A | 2/1993 | Noland et al. .............. | 110/246 |
| 5,216,821 A | 6/1993 | McCabe et al. .............. | 34/426 |
| 5,224,432 A | 7/1993 | Milsap, III ................... | 110/341 |
| 5,242,245 A | 9/1993 | Schellstede ............. | 405/128.9 |
| 5,259,945 A * | 11/1993 | Johnson et al. ............... | 208/13 |
| 5,361,514 A | 11/1994 | Lahoda et al. ................ | 34/391 |
| 5,449,251 A * | 9/1995 | Daily et al. ............ | 405/128.35 |
| 5,489,741 A * | 2/1996 | Weszely ...................... | 588/257 |
| 5,514,286 A | 5/1996 | Crosby ....................... | 210/742 |
| 5,558,463 A * | 9/1996 | Geisel ................... | 405/128.55 |
| 5,656,178 A | 8/1997 | Marchesi et al. ........... | 210/770 |
| 5,710,360 A | 1/1998 | Self et al. .................... | 588/213 |
| 5,830,752 A * | 11/1998 | Bruso ...................... | 435/283.1 |
| 5,904,904 A | 5/1999 | Swanson ..................... | 422/182 |
| 5,988,947 A | 11/1999 | Bruso ...................... | 405/128.6 |
| 6,120,579 A | 9/2000 | El-Shoubary et al. ......... | 75/742 |
| 6,146,596 A | 11/2000 | Hill et al. ................... | 422/117 |
| 2001/0021336 A1 * | 9/2001 | Plum .................... | 405/128.35 |

FOREIGN PATENT DOCUMENTS

| | | |
|---|---|---|
| CA | 1178048 | 11/1984 |
| CA | 2060814 | 9/1992 |
| CA | 1314403 | 3/1993 |
| CA | 2122224 | 10/1994 |
| CA | 2339590 | 3/2002 |
| DE | 3921591 A1 | 1/1991 |
| EP | 0 327 896 B1 | 8/1989 |
| EP | 0 405 067 B1 | 1/1991 |

\* cited by examiner

*Primary Examiner*—Robert E. Pezzuto
*Assistant Examiner*—Tara L. Mayo
(74) *Attorney, Agent, or Firm*—Greenlee, Winner and Sullivan, P.C.

(57) ABSTRACT

A process and apparatus for removing organic and inorganic contaminants from solid media such as drill cuttings, tank bottoms or contaminated soils. The process is conducted in at least one thermal screw conveyor which provides two or more separate temperature zones which can be operated as one or more of low temperature thermal desorption, high temperature thermal desorption and pyrolysis. Preferably the process is conducted in three interconnected thermal screw conveyors which each provide a separate temperature zone. The process is conducted such that the solid media in each of the temperature zones is held under a vacuum. Direct and indirect heating of the solid media in each of the temperature zones is provided. In the pyrolysis zone, an organic binder may be added to encapsulate inorganic contaminants such as metals.

41 Claims, 8 Drawing Sheets

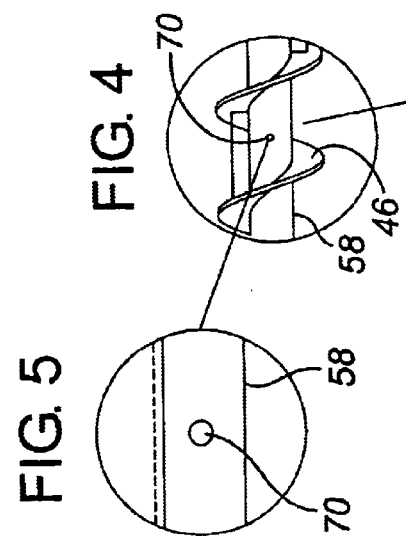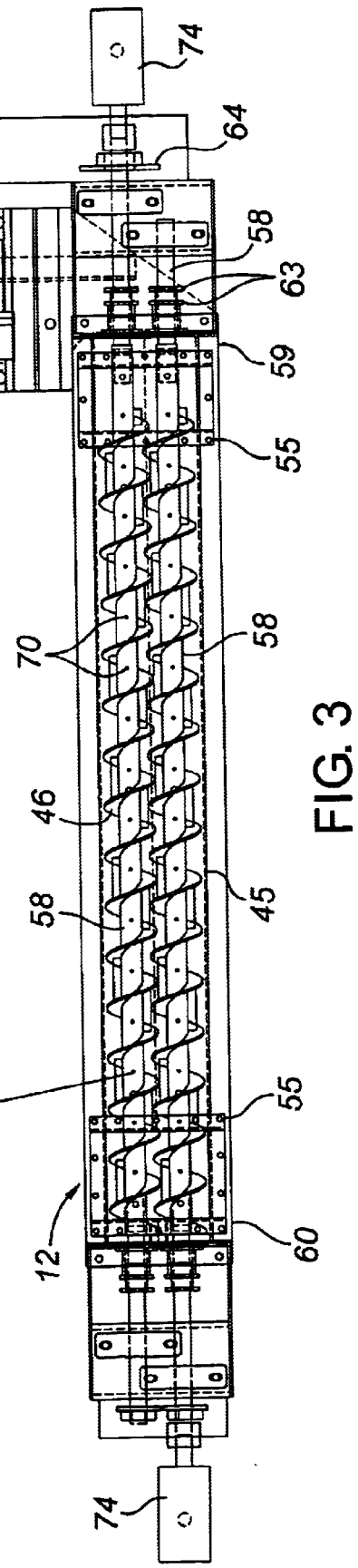

THERMAL REMEDIATION PROCESS

CROSS REFERENCE TO RELATED APPLICATION

This application claims priority from U.S. Provisional Patent Application No. 60/346,251, filed Jan. 3, 2002. To the extent that it is consistent herewith, the aforementioned application is incorporated herein by reference.

FIELD OF THE INVENTION

The invention relates to a process and apparatus for the thermal remediation of materials such as contaminated soil.

BACKGROUND OF THE INVENTION

Existing Technologies for Thermal Remediation

Several ex-situ technologies have been employed to vaporize contaminants from materials. Techniques that have been employed include thermal desorption or remediation as exemplified by U.S. Pat. No. 5,904,904, U.S. Pat. No. 5,710,360, U.S. Pat. No. 5,656,178, U.S. Pat. No. 5,514,286, U.S. Pat. No. 5,361,514, U.S. Pat. No. 5,242,245 and U.S. Pat. No. 5,188,041.

U.S. Pat. No. 5,904,904 presents a thermal desorption treatment technique for the removal of contaminants from particulate material using an inclined rotating drum similar to a rotary dryer or kiln. Removal of the contaminants moving through the system by rotating the kiln is accomplished by vaporizing the components in an air environment by the counter-current flow of air relative to the material employing both direct and indirect heat. A burner firing into the center of the drum applies direct heat. Process temperature is controlled with excess air. Hot products of combustion are passed through a set of fire tubes providing indirect heat to the process.

U.S. Pat. No. 5,710,360 presents a system that employs an inductive heating system tube surrounding a single screw conveyor for decontaminating materials. The tube is designed to withstand temperatures as high as 982° C. (1800° F.).

U.S. Pat. No. 5,656,178 presents a method for the thermal desorption of contaminated materials using superheated steam, acidification, and fluidization in a batch process. In this process the superheated steam is recycled with any water in the feed material being converted into superheated steam.

U.S. Pat. No. 5,514,286 presents a thermal desorption method and apparatus using a vacuum batch process for removing chemical contaminants from soil. The method employs a vacuum batch process where the vessel is a modification drum of a cement truck with ribbon flights.

U.S. Pat. No. 5,361,514 presents a method that removes volatile materials by thermal desorption in a controlled oxygen environment by employing a flat type belt conveyor with counter current gas flow over the top of the material on the belt.

U.S. Pat. No. 5,242,245 presents a method and apparatus for vacuum enhanced thermal desorption in a device that employs two concentric rotating cylinders. The contaminated material is desorbed and conveyed parallel to the cylinder axes through the annular space. Heat is supplied to the material from a centrally mounted heat source located inside the inner cylinder.

German Patent DE 405,067B1 relates to a device for removing volatile noxious substances from soil and similar materials and is directed to creating a device that allows for decontamination with a low energy loss. Contaminated soil is excavated for treatment and then ventilated a gas such as air, whereby the volatile noxious substances are desorbed from the surfaces of material particles and stripped from most material components. Only low temperature treatment is discussed, and higher temperatures are prohibitive given the injection of air.

EP 327, 896B1 describes a method of cleaning earth-like materials that includes reducing the material to a size of less than or equal to 40 mm with the addition of water and a solvent or a mixture of solvents.

U.S. Pat. No. 5,178,077 discloses an apparatus and method for the removal of higher and lower volatility organic contaminants from media. The apparatus includes an externally heated screw conveyor having one or more solid core flights. The media within the screw conveyor is heated to a temperature above which at least one of the contaminants volatilize. The volatilized contaminants are then vented from the screw conveyor. External heating is provided by at least one infrared radiation source external to the screw conveyer.

U.S. Pat. No. 4,917,023 discloses a system for fixing, encapsulating, stabilizing and detoxifying contaminants using a two zone pyrolysis. The first zone is a drying zone and the second is a stabilization zone. The zones are brought to temperature using infrared heaters, a baffle separates the two zones, a condenser receives effluent from the drying zone and an afterburner receives effluent from the stabilization zone. To aid in the pyrolysis of metal-containing feed material, this material is mixed with a carbon source to provide direct contact of the metals in the feed with a sufficient amount of a carbon source to achieve a fixation step.

U.S. Pat. No. 5,988,947 presents a multi-chambered soil remediation device that can be adapted to mount to a vehicle wherein each chamber has an inlet, an outlet and a soil conveyor. The soil conveyor of one chamber feeds material into the inlet of a subsequent chamber. The soil is treated as it is conveyed within the chambers by the injection and removal of materials.

U.S. Pat. No. 6,146,596 presents a method of soil remediation that includes heating and vaporizing contaminated compounds. A blower is used to withdraw the organic hydrocarbon gases and other vaporized contaminants through the soil and out to the condenser where the compounds are liquified and containerized.

U.S. Pat. No. 4,738,206 presents an apparatus and method for low temperature thermal stripping of volatile organic compounds from soil. The invention includes sealing the soil in a stripping conveyor against contact with air and vapor stripping the contaminants at a temperature below the boiling temperatures of the contaminants.

Limitations of Existing Technologies

Low temperature thermal desorption has process temperatures ranging from 90 to 316° C. (200 to 600° F.) in contrast to high temperature thermal desorption where temperatures range from 316 to 427° C. (600 to 800° F.). The desorption methods are commonly used to remove volatile and semi-volatile organics from a matrix material. These techniques are not effective in removing high boiling point organics such as coal tars or asphalt. The two common thermal desorption designs are rotary dryers and thermal screws. These desorption methods are described by the above-mentioned patents. These patents demonstrate the use of systems for thermal desorption that employ rotary dryers or kilns, high temperature belt conveyors and screw conveyors. Some of these patents also demonstrate both direct and indirect methods of heat transfer. Process conditions for these processes vary widely, with some indicating vacuum to near atmospheric pressures for separating organic contaminants and temperatures from ambient to 982° C. (1800° F.). However, if air or oxygen are introduced, this allows for the creation of CO and $CO_2$ by oxidation. Oxidation also changes the composition of the vaporized and non-vaporized organic contaminants present in the media being processed.

Pyrolysis is the chemical decomposition of organic materials induced by heat in an inert environment. Common names are molten solid processing or plasma pyrolysis. Organic materials are transformed into gas and a solid material containing fixed carbon and ash. Pyrolysis occurs at temperatures greater than 430° C. (800° F.). Common pyrolysis methods include rotary kilns, rotary furnaces and fluid bed furnaces. Pyrolysis is described by U.S. Pat. No. 4,917,023.

SUMMARY OF THE INVENTION

A thermal remediation process and apparatus are provided which have the flexibility, depending on the contaminated media to be treated, to allow for the practice of one or more of low temperature thermal desorption (LTTD), high temperature thermal desorption (HTTD) and pyrolysis (P), while achieving this with energy efficiency.

The process and apparatus are capable of removing organic and inorganic contaminants from solid media such as drill cuttings, tank bottoms or contaminated soils. The process is conducted in at least one thermal screw conveyor which provides two or more separate temperature zones which can be operated as one or more of low temperature thermal desorption, high temperature thermal desorption and pyrolysis. Preferably the process is conducted in three interconnected thermal screw conveyors which each provide a separate temperature zone. The process is conducted such that the solid media in each of the temperature zones is held under a vacuum in the presence of an inert, hot, non-condensible gas. Direct and indirect heating of the solid media in each of the temperature zones is provided. In the pyrolysis zone, an organic binder may be added to encapsulate inorganic contaminants such as metals.

Broadly stated, the invention provides a method of thermal remediation of contaminated solid media, comprising:

providing a vacuum housing equipped with at least one hollow shafted screw conveyor having a plurality of openings along its length, said vacuum housing providing two or more separate temperature zones along its length such that the temperature of each successive temperature zone can be maintained at a temperature which is equal to or greater than that of the previous temperature zone;

indirectly and separately heating the two or more temperature zones to temperatures sufficient to volatilize one or more of the contaminants in the contaminated solid media;

feeding the contaminated solid media into the at least one screw conveyor and conveying the contaminated solid media through the vacuum housing with mixing by rotating the at least one screw conveyor;

injecting a hot, inert, non-condensible gas through the plurality of openings in the at least one screw conveyor to directly heat the contaminated solid media in each of the temperature zones to temperatures sufficient to volatilize one or more of the contaminants in the contaminated solid media;

withdrawing the volatilized contaminants and the hot, inert, non-condensible gas from the at least one screw conveyor while holding the contaminated solid media under a vacuum;

maintaining the vacuum on the contaminated solid media;

separating the volatilized contaminants from the non-condensible gas; and discharging from the vacuum housing solid media reduced in contaminants.

In another broad aspect, the invention provides an apparatus for thermal remediation of contaminated solid media, comprising:

a vacuum housing equipped with at least one hollow shafted screw conveyor adapted to move the contaminated solid media along the length of the vacuum housing, said screw conveyor being formed with a plurality of openings along its length sufficient to introduce a gas, said vacuum housing being partitioned to form two or more separate temperature zones along its length such that the temperature of each successive temperature zone can be maintained at a temperature which is equal to or greater than that of the previous temperature zone;

means for feeding the contaminated solid media into the at least one screw conveyor;

means for rotating the at least one screw conveyor so as to convey the contaminated solid media along its length;

means for indirectly heating the two or more temperature zones to temperatures sufficient to volatilize one or more of the contaminants in the solid contaminated media;

means for injecting a hot, inert, non-condensible gas through the plurality of openings in the at least one screw conveyor to directly heat the contaminated solid media in each of the temperature zones to temperatures sufficient to volatilize one or more of the contaminants in the solid media;

means for withdrawing the volatilized contaminants and the hot, inert, non-condensible gas from the at least one screw conveyor and for holding a vacuum on the contaminated solid media;

means for controlling the rate of injecting the hot, inert, non-condensible gas so as to maintain the vacuum on the contaminated solid media;

means for separating the volatilized contaminants from the hot, inert, non-condensible gas; and means for discharging the solid media from the vacuum housing.

BRIEF DESCRIPTION OF THE DRAWINGS

FIG. 3 is a top sectional view of one of the twin hollow shafted screw conveyors, without the heater or insulation details;

FIG. 4 is an enlarged view of the gas openings and the flight detail of the hollow shafted twin screw conveyor of FIG. 3;

FIG. 5 is a still further enlarged view of the openings in the twin screw conveyor of FIG. 4;

DESCRIPTION OF THE PREFERRED EMBODIMENTS

Figure 1:
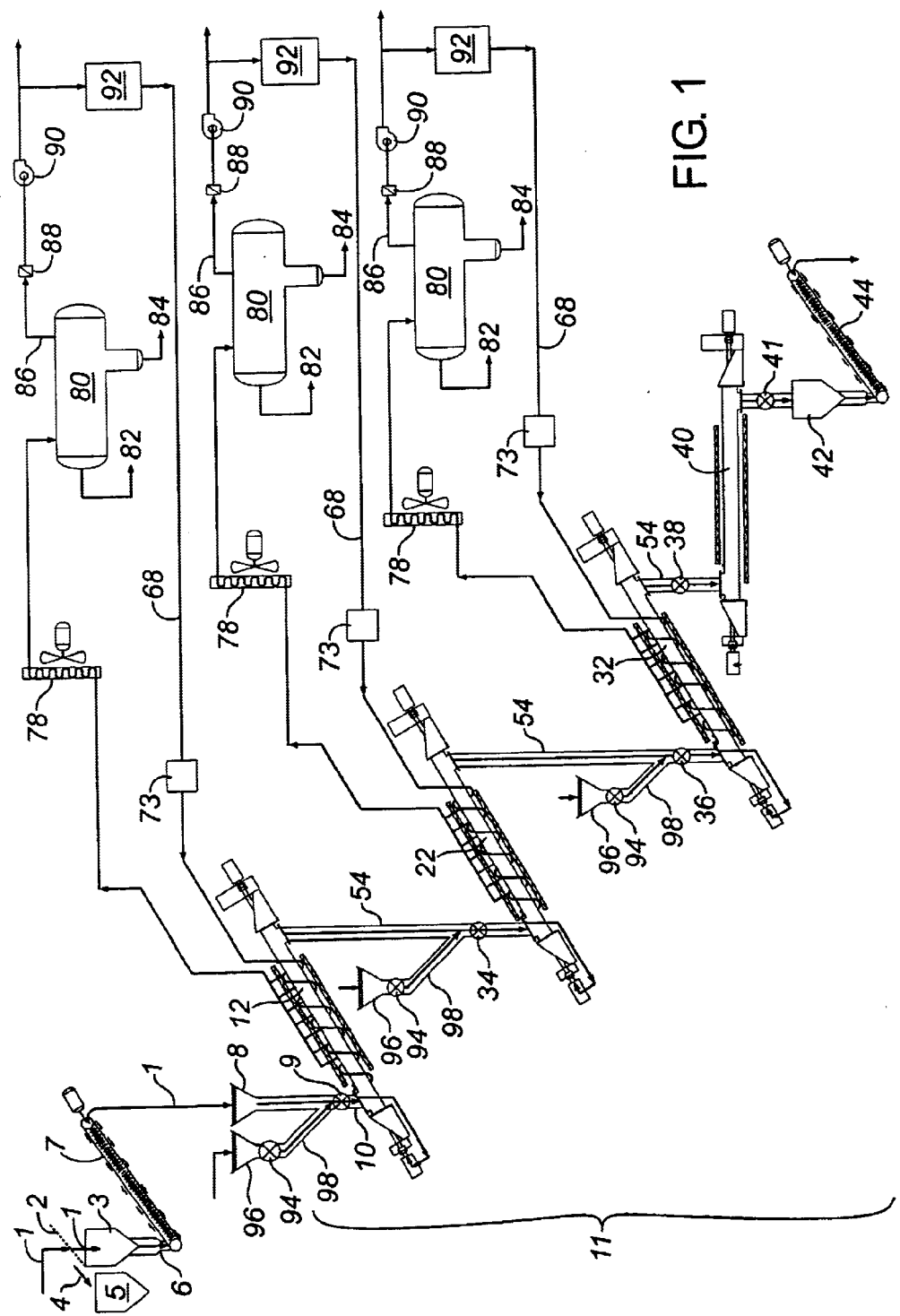
FIG. 1 is a schematic flow diagram of the process and apparatus of the present invention, using three thermal screw conveyors along with the separate controls for each.

As used herein and in the claims the following terms have the meanings and definitions set out below.

The term "contaminant" refers to undesirable chemical species, whether organic or inorganic. Typical contaminants include those chemical species that are persistent in the environment and are known to be toxic to humans and wildlife, such as halogenated organics, hydrocarbons and metals. The contaminants are present in contaminated solid media such as muds, soils, sludges and tank bottoms. The organic contaminants, or organics, consist of low and/or high volatility organics, semi-volatile organics and heavies. By low volatile organics is meant low boiling point, low molecular weight organics. By high volatile organics is meant high boiling point, high molecular weight organics. By heavies is meant non-volatile, high molecular weight organics. By inorganic contaminants is meant volatile and non-volatile metals.

The term "contaminated solid media" refers to any solid material containing unacceptable levels of organic and/or inorganic contaminants, including for example oil based drill cuttings, contaminated soil, tank bottoms, and metal-containing sludge.

The terms "thermal remediation" and "thermal desorption" are meant to include the processes for reducing the content of organic and/or inorganic contaminants from a solid media with the application of heat sufficient to vaporize one or more organic components and/or encapsulate one or more inorganic contaminants.

The term "organic binder" refers to a carbonaceous material which is capable of encapsulating inorganic contaminants such as metals at the high temperatures of pyrolysis. Exemplary are heavy oil having a carbon value of C60 or greater, and asphalt.

The term "inert, non-condensible gas" is meant to refer to a substantially inert gas for thermal desorption and pyrolysis, and a gas which is not readily condensed and which do not pose a risk of combustion or explosion on heating to the high temperatures of thermal desorption or pyrolysis. Exemplary gases are those including nitrogen and argon. The inert, non-condensible gas might include light non-condensible gases such as methane during recycle, as explained herein. Excluded from the inert, non-condensible gas are oxygen-containing gases such as air or $CO_2$ which can interfere with thermal desorption, promote oxidation or cause combustion or explosion.

The term "hollow shafted screw conveyor" refers to a screw or auger type conveyor having a uniform flight adapted to convey solids along its length on rotation, the flights being mounted on a hollow shaft. The term "twin, hollow shafted screw conveyor" refers to a pair of hollow shafted screw conveyors, mounted parallel to each other, with uniform and common pitch flights which intermesh with each other such that combined rotation moves solid media along the length of the screw conveyor. A hollow shafted screw conveyor is sometimes referred to as a "hollow flight" or "holoflyte" screw conveyor or auger. Herein, the hollow shafted screw conveyor is also sometimes simply referred to by the term "screw".

The term "vacuum housing" is meant to include either a single vacuum enclosure or a series of interconnected vacuum enclosures being sealed so as to be capable of holding a vacuum within the housing on the media held therein. In the preferred embodiments of the invention, the vacuum housing is provided by the exterior walls or shells of the one or more interconnected screw conveyors, with all inlets, outlets and connections being sealed so as to maintain the vacuum within the housing on the media held therein.

The process and apparatus of the present invention are described below with reference to the Figures. FIG. 1 shows an overview of the preferred process and apparatus, wherein three screw conveyors are used, with each one defining a separate temperature zone. Each of the temperature zones is operated under a controlled vacuum, at the same or different operating temperatures to achieve one or more of LTTD, HTTD and/or pyrolysis of the feed, as described more fully below.

With reference to FIG. 1, the raw feed material 1 or contaminated solid media is deposited on a static screen 2 after which the contaminated solid media 1 (also referred to as material below) enters a feed hopper 3. The feed hopper 3 might be a mass-flow or funnel flow type bin equipped with a vibrating hopper to assist in feeding. The angle of the static screen 2 may be adjusted from between 0 to 60° in order to discharge oversized material or debris 4 (generally 5 cm (2") and larger) into a collection bin 5. From the feed hopper 3, the material 1 is metered at a rotary valve 6 onto a belt conveyor 7 for conveying to an inlet feed hopper 8. From the inlet feed hopper 8 the material is metered via a rotary valve 9 through an inlet chute 10 into the thermal remediation unit shown generally at 11. The rotary valve 9 is designed to control the material 1 entering the thermal remediation unit 11 and to ensure that the unit 11 can be maintained under a vacuum sufficient to prevent the escape of any gases from the unit 11. The thermal remediation unit 11 is shown to consist of three twin thermal screw conveyors configured in series shown as 12, 22, and 32 in FIG. 1.

Each thermal screw 12, 22, and 32 is designed to operate under a vacuum, with separate temperature controlling means, as described below, so as to be capable of operating as one or more of a low temperature thermal desorption (LTTD), high temperature thermal desorption (HTTD) or as a pyrolysis (P) unit. The preferred operating temperature for low temperature thermal desorption is $\leq 316°$ C., more preferably 235 to 316° C., and from >316 to 427° C. for high temperature thermal desorption. Pyrolysis, which is preferably operated also as an encapsulation process, is typically conducted at a temperature of >427 to 649° C., more preferably >427 to 538° C.

Under typical operating conditions, the material 1 first enters a low temperature desorption zone (first screw conveyor 12) before entering the high temperature thermal desorption (second screw conveyor 22) and pyrolysis zone (third screw conveyor 32). One, two or all the screw conveyors 12, 22 and 32 may be operated at the same or different temperatures depending on the levels and types of contamination associated with the material. The separate temperature zones may be configured as three separate thermal screw conveyors (as in FIG. 1) or as a single screw conveyor with three distinct operating zones provided by partition baffles or the like. In FIG. 1 the three separate temperature zones are configured as three separate thermal screw conveyors 12, 22 and 32. In either case, each of the thermal screw conveyors 12, 22 and 32 (or separate temperature zones) may be operated as one or more of a low temperature thermal desorption, high temperature thermal desorption or pyrolysis system. The process is thus flexible and is operated according to the contamination associated with the particular material.

The thermal screw conveyors 12, 22 and 32 are preferably designed to operate at a carrying capacity from between about 30% to 50% full. The low temperature desorption zone such as that provided in the first thermal screw conveyor 12 may be operated at LTTD temperatures to volatilize organics and some metals to fractionate and partition the contaminants associated with the material. The second thermal screw conveyor 22 may be operated at HTTD temperatures to volatilize semi-volatiles. The third thermal screw conveyor 32 may be operated as a pyrolysis zone at pyrolysis temperatures, with, if needed, the addition of one or more organic binders such as asphalt or very heavy oil ($\geqq$C60), to serve as a carbonaceous source to coat and encapsulate the inorganic contaminants such as metals to the solid material matrix.

As shown in the later Figures, each of the thermal screw conveyors 12, 22 and 32 are generally identical, and may be inclined from the horizontal at an acute angle ranging from about 1° to 45° (i.e., inclined upwardly toward the outlet or discharge end). The screws 12, 22 and 32 are preferably arranged in a vertical stack (see FIG. 10) such that the output of the first screw 12, is metered through a rotary valve 34 into the second screw 22, and the output of the second screw 22 is metered through a rotary valve 36 into the third screw 32. The output from the third screw 32 is fed through a rotary valve 38 into a cooling screw 40. The cooling screw 40 may be arranged horizontally, and serves to cool the solid media before disposal. The solid medium from the cooling screw 40 is discharged through rotary valve 41 into a disposal hopper 42, from which it is metered onto a loadout conveyor 44.

The thermal remediation unit 11 of this invention is held under a vacuum, as will be more fully described below. The walls of each of the three screw conveyors 12, 22 and 32, combined with vacuum seals, chutes, valves and connections described herein at the inlets and outlets of each screw combine to function as a vacuum housing. In the Figures, the vacuum housing is depicted generally the screw housing 45. However, it will be understood that the vacuum is held between rotary valve 9 and rotary valve 38 in FIG. 1, and thus the vacuum housing includes more than the screw housing 45, and actually extends between and includes all parts between the two valves 9 and 38.

Each of the screw conveyors 12, 22 and 32 is a twin, hollow shafted screw auger or conveyor 46 (referred to sometimes herein as twin screws 46). In FIGS. 2–9, the detail is shown for only one of the screw conveyors, labeled generally as 12, but it should be understood that each of the first, second and third screw conveyors 12, 22 and 32 are generally identical having like parts.

Figure 2:
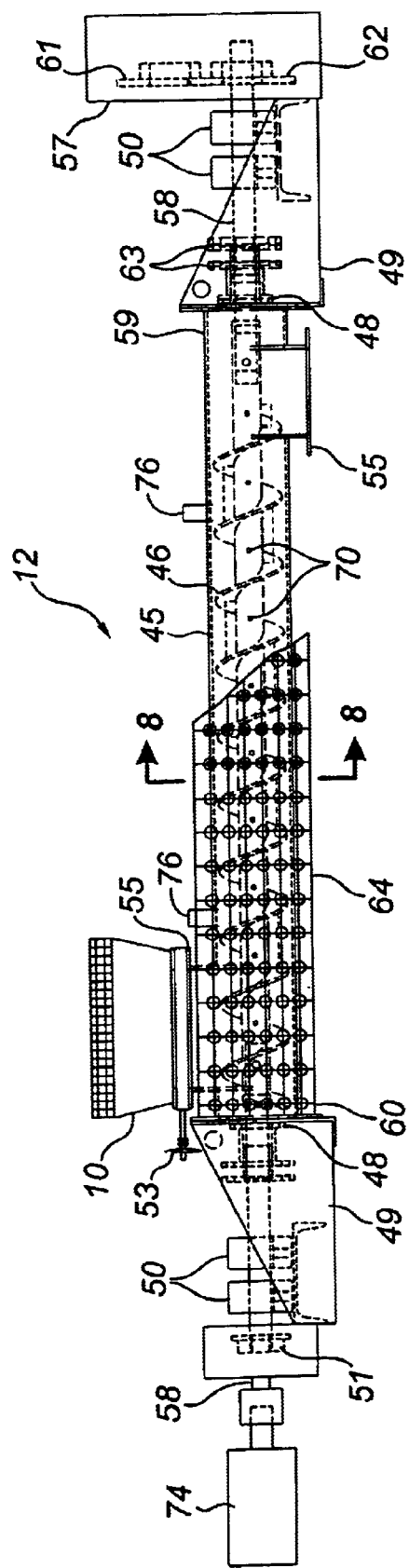
FIG. 2 is a side sectional view of one of the thermal screw conveyors, showing the heater partially cut away, and without the insulation detail.
Figure 8:
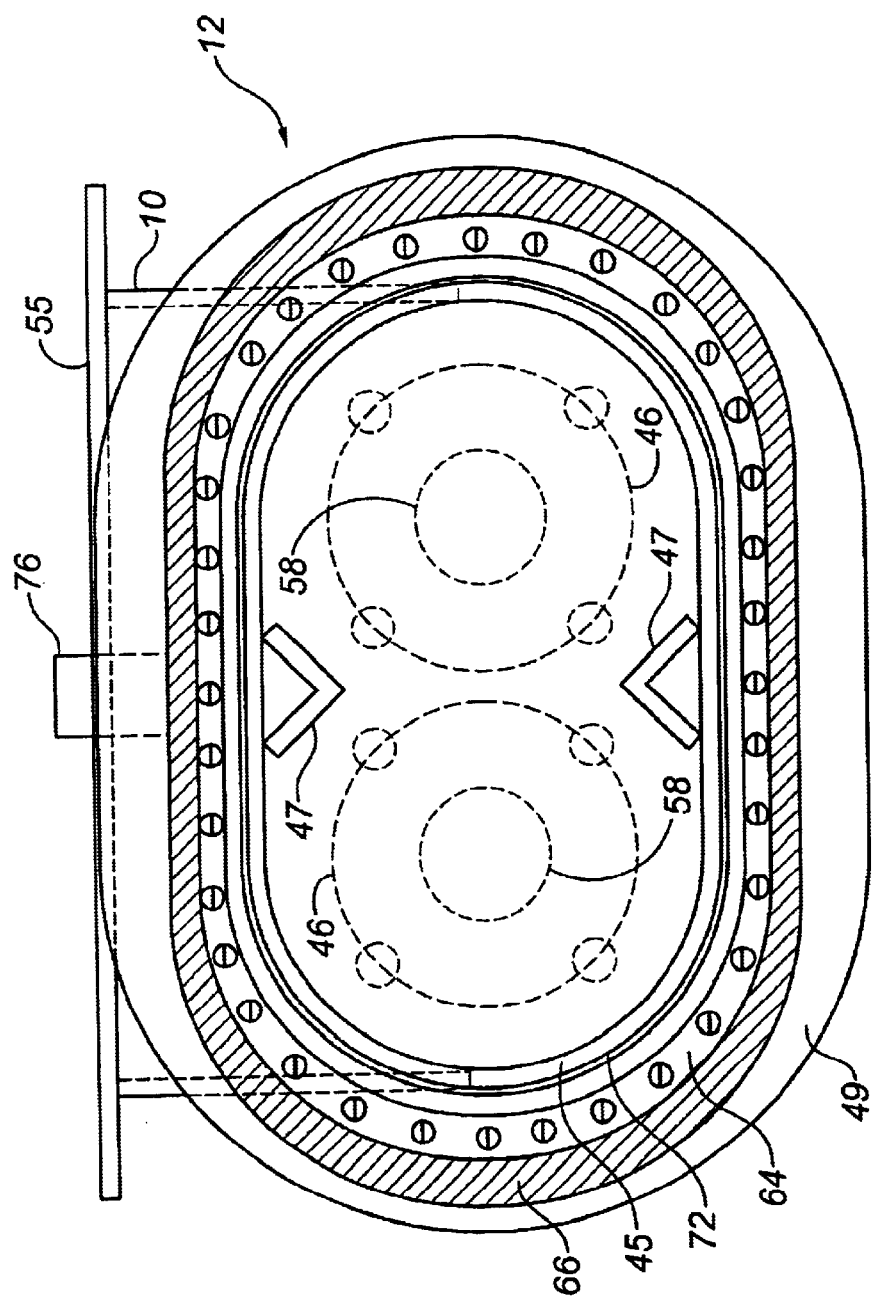
FIG. 8 is a sectional view of the twin screw conveyor, taken along line 8—8 of FIG. 2.

The material in the thermal screws 12, 22 and 32 is moved along the length of each screw by rotating both of the twin screws 46, generally in a clockwise direction. The flights on the screw are designed to convey, mix and lift the material 1 and the intermesh between the flights on each screw is designed to be self-cleaning and to prevent material accumulation from adhering. As shown in FIG. 8, the screw housing 45 generally conforms to the perimeter of the twin screws 46, and includes a baffle 47 to minimize material buildup between the twin screws 46. The twin screws 46 and the screw housing 45 may be constructed of carbon steel or stainless steel, with stainless steel being preferable for high temperature use. The twin screw housing 45 is manufactured as a single piece unit through fuse welding of two half sections (not shown). The ends of the screw housing 45 are sealed and gasketed, as best seen in FIG. 2, to include end plate packing seals 48, end brackets 49, shaft stability packings 50 and shaft packing seals 51. The screws 12, 22 and 32 are bolted in a vertical stack through end brackets 49 to a stand 52, or other mobile unit (see FIG. 10). A vacuum slide gate valve 53 may be included between the inlet chute 10 and the screw housing 45. The inlet chute 10 and the discharge chute 54 for each screw conveyor 12, 22 and 32 are generally flange connected in a sealed manner through inlet and outlet flanges 55.

Figure 6:
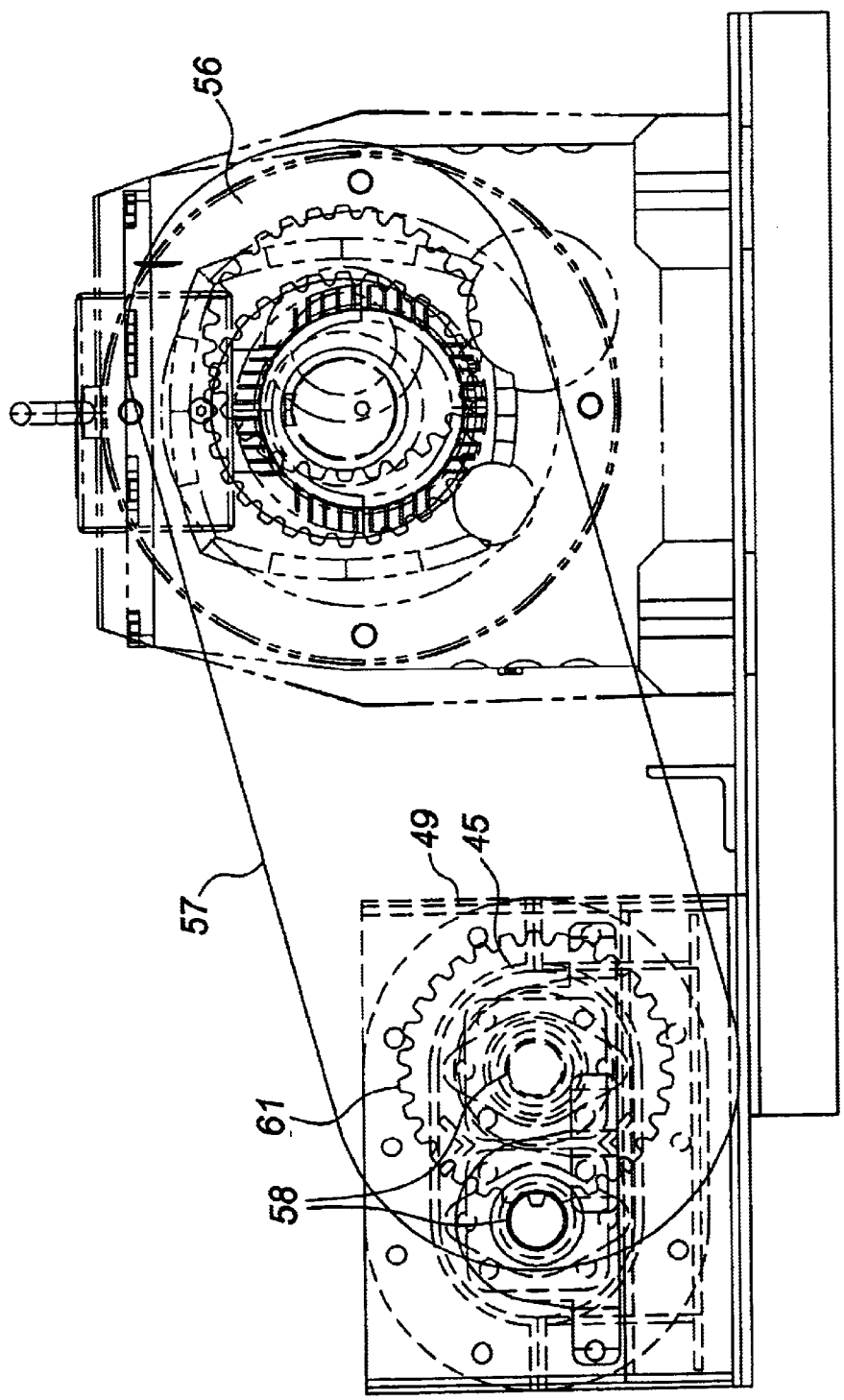
FIG. 6 is an end view of one of the thermal screw conveyors showing the drive motor for the twin hollow shafted screw conveyors.

The twin screws 46 are rotated using a variable speed indirect drive motor 56 (see FIG. 6), mounted offset at the discharge end or output end of each screw 12, 22 and 32. Exemplary is the roller chain drive motor of the type supplied by SEW Euridrive Motor, Calgary, Alberta, Canada, capable of operating at 0–100 rpm. The motor 56 is attached to the end of the screws 12, 22 and 32 opposite to where the material 1 enters the screw 12, 22 and 32. A chain and roller assembly 57 is shown in FIG. 6 connecting the shafts 58 of the hollow shafted twin screws 46 and the motor 56 is used to rotate the twin screws 46 to ensure they operate at the same rotational speed. The twin hollow shafted screws 46 are "fixed" connected at the motor end 59 and free floating at their opposite end 60 (see FIG. 3) to account for material thermal expansion and to prevent binding of the twin screws 46. The chain and roller assembly 57 includes a driven large sprocket 61, which in turn rotates a smaller sprocket 62 attached to one of the screw shafts 58. The other of the screw shafts 58 is driven through a second set of sprockets 63 (see FIG. 2).

The rotational speed at which the thermal screws 12, 22 and 32 operate is adjustable and dependent upon such parameters as the levels and types of contamination and the moisture content associated with the material.

The material in the screw housing 45 is directly and indirectly heated. Indirect heating is achieved by applying a heat source to the exterior shell surface or walls of the screw housing 45. An example of such a heat source is a thermal wrap electrical heating pads 64 (see FIG. 7). These thermal wrap electrical heating pads 64 may be ceramic self-forming pads of the type that may be obtained from Cooper Heat-MQS Canada, Edmonton, Alberta, Canada. To minimize heat loss the electrical heaters are wrapped with high temperature insulation 66 with 5 cm being the preferred minimum insulation thickness. The heating pads 64 might be replaced by a hot oil heating system or a molten salt heating system if desired. In the case of the electric thermal wrap heating pads 64, temperatures in each of the thermal screw conveyors 12, 22 and 32 are indirectly and separately controlled via a series of temperature sensors (not shown) attached outside the screw housing 45 connected to separate controls (not shown).

Figure 7:
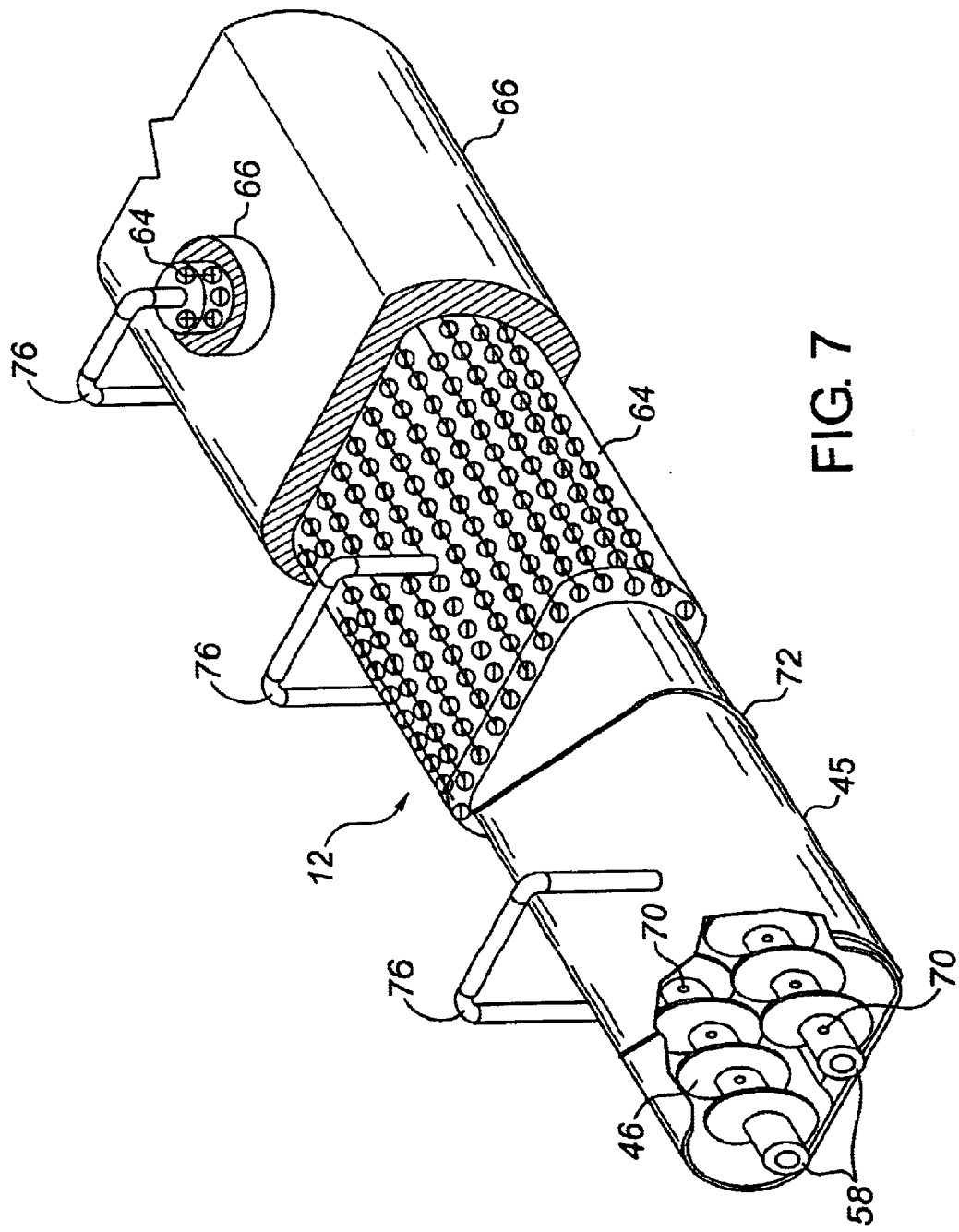
FIG. 7 is a partial, perspective view of one of the thermal screw conveyors showing the details of the twin screw conveyor, the gas exit manifolds, the heaters and the insulation.
Figure 9:
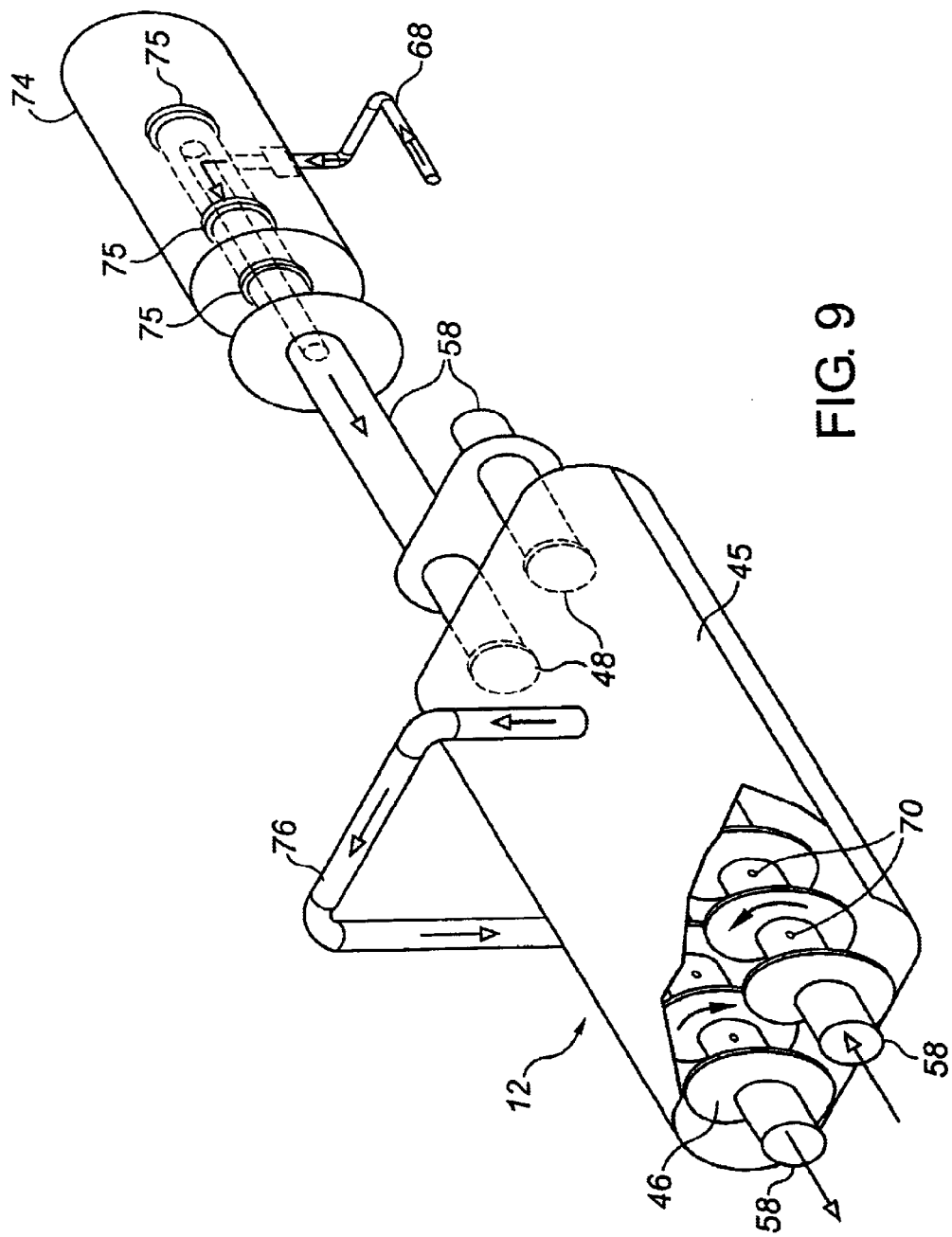
FIG. 9 is a schematic, partial perspective view of one of the twin screw conveyors, showing the rotary swivel to introduce gas to the shafts of the hollow shafted screw conveyor.

The material 1 is also directly heated using a hot gas delivery system (see FIGS. 7 and 9). A hot, inert, non-condensible gas is circulated from gas lines 68 through a plurality of openings 70 along the length of the screw shafts 58 (see FIGS. 4 and 7) and distributed into the material while it is being conveyed. The injection of a hot gas serves to directly heat the material to assist in the volatilization of organics and create an inert environment to prevent the combustion and/or oxidization of the organics. Exemplary hot gases are a recycled light vapor product/inert gas mixture produced as a recycle stream from continued operation of the units and/or an inert gas such as nitrogen or argon. In the case of gas recycle the gas mixture may contain non-condensible gases such as methane together with the original inert gas. In the case of start-up or when the gas is not recycled, the gas usually consists only of an inert gas. The gas flows from the source (not shown) or through gas lines 68 through flexible stainless steel conduits 72 (see FIG. 8) wrapped around the exterior of the screw vacuum housing 45 beneath the heating pads 64 to pre-heat the gas prior to entry into the hollow shafted screw 46. Rotometers 73 measure and regulate the flow of the gas. In this manner, the rate of injecting of the hot gas into each of the three screw conveyors 12, 22 and 32 is controlled to ensure that the vacuum is maintained in a controlled and set manner in each screw conveyor 12, 22 and 32.

The pre-heated gas enters into the shafts 58 of the hollow shafted screw 46 through a high temperature, high pressure rotary swivel 74, preferably formed of stainless steel construction. An exemplary swivel 74 (see FIG. 9) may be obtained from Pneutech Inc., a Division of Federal Industrial Products, Montreal, Quebec, Canada. The swivel 74 is rigidly connected to the hollow shafted screw shafts 58 that protrude from the screw housing 45. Multiple seals 75 between the shafts 58 and the swivel 74 and the housing 45, including end plate packing seals 48 create air tight connections. The swivel 74 serves to provide an air-tight, rotating connection for the hot gas into the screw shaft 58. The hot gas flows into the shaft 58 and exists through the openings 70 along the length of the shaft 58. The openings 70 (see FIG. 7) are distributed along the length of the shaft 58 to allow equal distribution of the gas through the material as it is being conveyed and mixed. Due to space constraints in the preferred embodiments shown in the Figures, rotary swivels 74 are provided at both ends of the screw conveyors 12, 22 and 32, with each swivel 74 injecting gas into one or the two hollow shafts 58 of the twin screws 46. In a larger unit, a single swivel might be used to simultaneously inject the gas into both of the shafts 58. With this gas injection through the openings 70, the injected gas is neither co-current or countercurrent to the gas flow within the screw conveyors 12, 22 and 32, which is dissimilar to much of the prior art. Rather, the direction of the injected gas is cross current to the gas flow within the screw conveyors 12, 22 and 32, as best seen in the directional arrows in FIG. 9.

The hot gas together with the volatile fraction which can include volatiles, some metals and water vapor are withdrawn from the vacuum housing 45 through a plurality of gas exit manifolds 76 (heated with heating pads 64 and insulated with insulation 66, as shown in FIG. 7). The number of gas manifolds 76 are determined based on the levels and types of contamination associated with the material. However, gas manifolds are preferably located along the entire length of the screw housing 45 to ensure equal capture of the hot gases.

The gas manifolds 76 are connected to a forced air cooler or refrigeration system 78 where the volatile compounds are cooled and condensed. The condensed liquids consisting of the volatiles and water are discharged into a three-phase separator 80 that separates water, oil and gas. Exemplary three-phase separators are vertical centrifugal separators or diverging vortex separators or horizontal three-phase separators. Through operation of a level control system the condensed organic liquid fraction 82 is drained. Through operation of a level control system the water fraction 84 is drained from the separator 80. Any non-condensible gases are fed through line 86 for purification through an in line filter 88 to remove any residual liquids before passing through the blower 90. From the blower 90 the gases are treated using the gas scrubber 92 before recycled for reuse in the thermal screws 12, 22 and 32. Preferred operation is to recycle the inert gas fraction.

The thermal screws are operated to place the material being processed under a vacuum. This holds the screw housing 45 and the material being processed under a vacuum from the rotary valve 9 at the inlet chute 10 of the first screw conveyor 12, through to the rotary valve 38 at the discharge chute 54 of the third screw conveyor 32. The degree of the operating vacuum pressure may range from a slight vacuum, for example 35 kPa (5 psia), down to a vacuum of 0.7 kPa (0.1 psia). Most preferred is a moderate vacuum such as 20.7 kPa (3 psia) down to a vacuum of 0.7 kPa (0.1 psia). Organic material and residual moisture that volatilizes from the material are removed from the thermal screw conveyors 12, 22 and 32 under a vacuum through operation of the blower 90. Operating the thermal screws 12, 22 and 32 under a controlled vacuum without oxygen makes the process more energy efficient achieving a higher degree of volatilization of volatiles and semi-volatiles at lower temperature settings.

Hot gases exiting through the gas manifolds 76 avoid the entry of suspended solids which can lead to fouling of the gas collection piping (for example by tapering the exit manifold 76).

As set out above, the first thermal screw conveyor 12 is preferably conducted as a low temperature thermal desorption unit. Following thermal desorption in the first thermal screw 12, the material may be discharged into a second thermal screw conveyor 22 where the material undergoes low or high temperature thermal desorption that operates as described above, with hot gases exiting the thermal screw 22 under a vacuum through the gas outlet manifolds 76. Following thermal desorption in the second thermal screw 22 the material is discharged into the third screw conveyor 32 where the material undergoes either low or high thermal desorption or pyrolysis. Pyrolysis is typically conducted when the material contains substantial quantities of inorganics such as metals that require encapsulation. The thermal screw 32 operates as described above at the appropriate temperature for the operating condition desired. Similarly, the hot gases exit the thermal screw 32 under a vacuum through the gas outlet manifolds 76. In the case of pyrolysis, a binder consisting of a heavy oil or asphalt is metered via a rotary valve 94 from a binder hopper 96, into a secondary inlet chute 98 of the thermal screw 32 where it is intermixed with the material. The mix ratio, type and concentration of the binder added varies with such parameters as the levels and types of contamination in the material. In FIG. 1, each of the thermal screw conveyors 12, 22 and 32 are shown to include the binder hopper 96, valve 94 and chute 98, although these features may be omitted from any screw conveyors that need not function as a pyrolysis unit.

The rotary valves described above serve to meter material and to create an air tight seal to prevent the escape of hot gases during operation.

Figure 10:
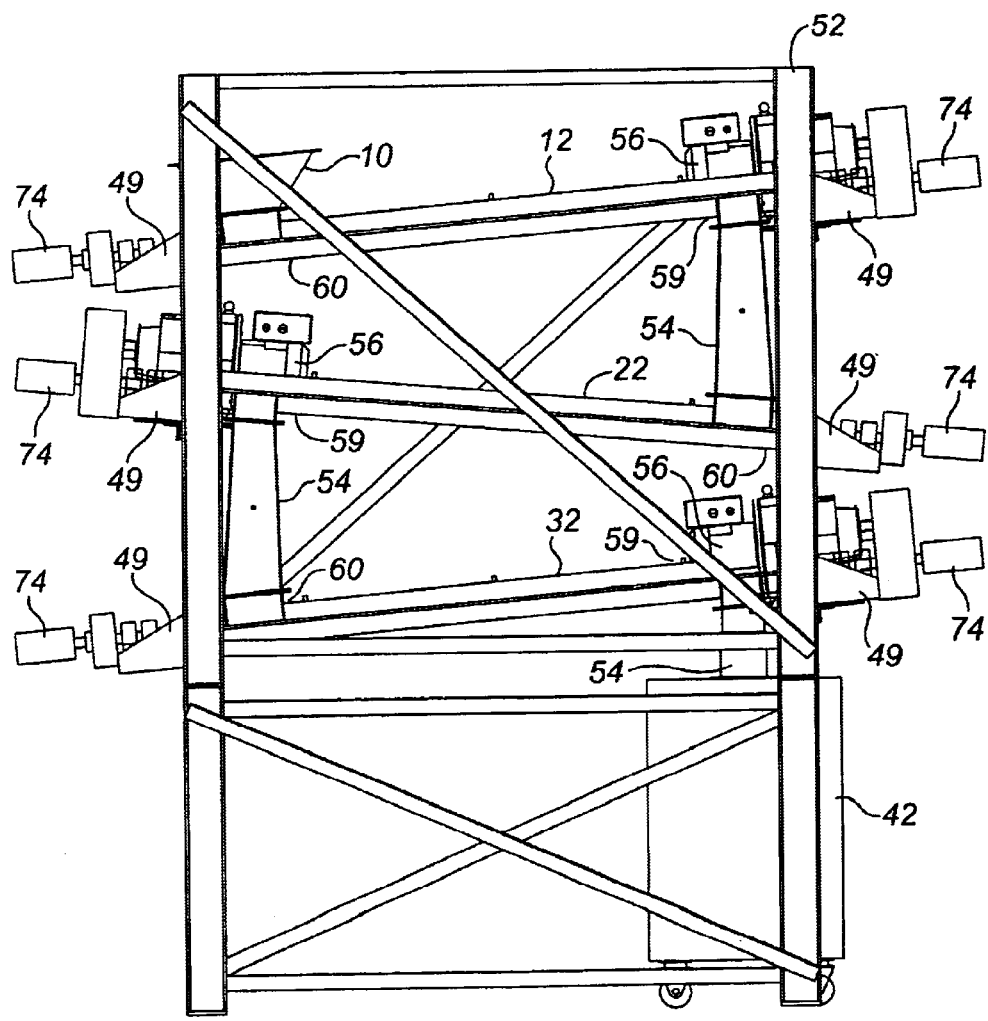
FIG. 10 is a side view of the three screw conveyors in an inclined and vertically stacked position on a portable, mobile stand.

In FIG. 10, the three thermal screws 10, 22, and 32 are each about 3 m (10 feet) in length or longer, are shown in a vertical stacked relationship, however, they may be configured in any manner. For example, they may be configured end to end, with the thermal screws placed in a horizontal or angled inclined position. The angle of incline is dependent on the liquid concentration associated with the material. Materials with high liquid concentrations are treated with thermal screws orientated in a near horizontal position.

To avoid energy loss or condensation between the thermal screw conveyors, each of the discharge chutes 54 of the thermal screw conveyors 12, 22 and 32 is wrapped with electrical heaters and insulation (not shown).

The present invention provides a process and apparatus capable of remediating highly contaminated materials, preferably with a water moisture content of less than about 20% by weight, making it suitable for a variety of applications. Applications include invert drill muds, residual tank bottoms, and contaminated soils. Combined with the operating flexibility of the unit, the process is capable of treating materials contaminated with both organic and inorganic constituents. The invention has application in the remediation of materials contaminated with contaminates such as non-halogenated and halogenated volatile and semi-volatile organics, fuels, and inorganics. These types of contaminates are associated with industrial wastes derived from agricultural, chemical processing, petroleum reefing and reuse processing, paint and ink manufacturing, plastics manufacturing and pharmaceutical manufacturing industries. Pretreatment by way of blending or material dilution is not required, substantially reducing the complexity and overall cost of the treatment of highly contaminated material.

Preferred process details are summarized below:

Operating Temperature Zones:
Low Temperature Thermal Desorption: $\leq 316°$ C. ($\leq 600°$ F.), more preferably 235 to 316° C.
High Temperature Thermal Desorption: >316 to $\leq 427°$ C. (600 to 800° F.).
Pyrolysis: >427 to $\leq 649°$ C. (>800 to $\leq 1200°$ F.), more preferably >427 to $\leq 538°$ C.
Vacuum Range:
Slight Vacuum: 35 kPa (5 psia)
Moderate Vacuum: 20.7 kPa to 14 kPa (3 to 2 psia)
Maximum Vacuum: 0.7 kPa (0.1 psia)

Advantages and Distinctions Over Existing Technologies

The process and apparatus of the present invention have advantages over, and differ from, prior existing technologies as set out below:

1. The invention provides a single process unit designed to operate separately as low temperature thermal desorption, high temperature thermal desorption and pyrolysis units or in series or as any combinations thereof.
2. The invention provides a unique method for operation of the process in an energy efficient manner. This is accomplished by holding the material to be processed under a vacuum using a blower to remove vapors from the screw housing and to create the vacuum, using vacuum rated fittings, valves and construction materials throughout the apparatus, and controlling the rate of hot gas injected into the screw conveyors so as to maintain and control the vacuum in a set manner.
3. The invention provides a unique method of hot, inert gas injection into the process for direct heating while preventing combustion and/or oxidation of vapors. This is accomplished using a hot, inert gas injection through a high temperature swivel and specially sized gas openings located along the shaft of each hollow shafted screw.
4. The process is preferably designed to use and recycle the hot gases that may consist of both the light non-condensibles produced from continued operation of the unit and the inert gas to eliminate the combustion and/or oxidation of vapors during the processing of materials.
5. The screw conveyors are designed to convey, turn, mix, be self-cleaning, and directly heat the material during processing.
6. The process is capable of processing a variety of waste types containing organic contaminant concentrations levels up to a maximum of 95% by volume.
7. The process is capable of processing waste types containing inorganic contaminants through the addition of a carbon source binder added prior to pyrolysis for metal encapsulation.
8. The process is easily adaptable to a wide range of operating parameters to control retention time, system operating pressure, operating temperature, and capacity to satisfy the end process treatment criteria for varying feedstock materials.

EXAMPLES

Pilot plant tests were conducted on oil and gas drill cuttings to determine the hydrocarbon contamination in the processed material with respect to average operating temperature. A thermal remediation unit as described above, with three screw conveyors equipped with twin hollow shafted screw conveyors, and operated under vacuum, was used in all the examples.

Raw Material Feed Stock Characterization

Described below is the raw drill cuttings feed as used in the experimental tests:

Oil Content: 25.6 to 24.2% by weight
Water Content: 6.44 to 7.44% by weight
Solids Content: 67.2 to 69.3% by weight Standard Operating Conditions for All Examples Summarized below the equipment and process operational set-points of the examples:

Screw Rotational Speeds:
(i) low temperature thermal desorption (LTTD) (screw #1): 1 rpm
(ii) high temperature thermal desorption (HTTD) (screw #2): 1.5 rpm
(iii) pyrolysis (P)(screw #3): 2.0 rpm
Process Design Capacity: 45.4 kg/hr (100 lb/hr)
Angle of Thermal Screws: 5°
Hot Gas Flow Rate: 10 L/min
Vacuum Operating Pressure: 20.7 kPa (3 psia)
Operating Test Temperatures: 260° C.(500° F.); 316° C. (600° F.); 371° C. (700° F.); 427° C. (800° F.); 482° C. (900° F.); and 538° C. (1000° F.)

Operating Configurations:

Summarized in Table 1 are the different operating configurations investigated.

TABLE 1

Operating Configurations of Screws

| Test | Screw #1 | Screw #2 | Screw #3 | Comments |
|------|----------|----------|----------|----------|
| 1 | 204° C. (400° F.) | 204° C. (400° F.) | 204° C. (400° F.) | All 3 screws operated as LTTD |
| 2 | 260° C. (500° F.) | 260° C. (500° F.) | 260° C. (500° F.) | All 3 screws operated as LTTD |
| 3 | 316° C. (600° F.) | 316° C. (600° F.) | 316° C. (600° F.) | All 3 screws operated as LTTD |
| 4 | 316° C. (600° F.) | 427° C. (800° F.) | 538° C. (1000° F.) | LTTD/HTTD/P |
| 5 | 204° C. (400° F.) | 316° C. (600° F.) | 316° C. (600° F.) | All3 screws operated as LTTD |
| 6 | 371° C. (700° F.) | 371° C. (700° F.) | 371° C. (700° F.) | All 3 screws operated as HTTD |
| 7 | 427° C. (800° F.) | 427° C. (800° F.) | 427° C. (800° F.) | All 3 screws operated as HTTD |

Operating Temperature Zones:
  Low Temperature Thermal Desorption: $\leq 316°$ C. ($\leq 600°$ F.)
  High Temperature Thermal Desorption: $>316°$ C. to $427°$ C. ($>600$ to $800°$ F.)
  Pyrolysis: $>427°$ C. to $649°$ C. ($>800$ to $1200°$ F.)
  Vacuum Range: Experiments conducted at a vacuum pressure of 20.7 kPa (3 psia).

Example 1

In this example, each of the three screw conveyors was operated at the same temperature, as shown in Table 2. The Table 2 results show treatment performance improved with operating temperature. The best results were achieved at the operating temperature of 427° C. (800° F.) in which the residual hydrocarbon contamination was <10 mg/kg, or well below the regulated criteria for remediated soils in Alberta, Canada.

TABLE 2

Processed Material Hydrocarbon Concentration as a function of Maximum Operating Temperature

| Maximum Temperature ° C. (° F.) | Total Petroleum Hydrocarbon mg/kg |
|---|---|
| 204 (400) | 34,510 |
| 260 (500) | 6,200 |
| 316 (600) | 250 |
| 427 (800) | <10 |
| 538 (1000) | <10 |

Example 2

Below is example data depicting the benefits of operating the thermal screws under a vacuum. The pilot plant was operated at a capacity of 45.4 kg/hr (100 lb/hr), with a vacuum pressure of 20.7 kPa (3 psia), with a hot gas recycle flow rate of 10 L/min. Screw rotational speed was 2 rpm and less. The three screw conveyors were configured to operate at the temperatures 204° C. (400° F.) in screw #1, 204° C. (400° F.) in screw #2, and 204° C. (400° F.) in screw #3.

Table 3 shows the results. Compared are the reductions in hydrocarbon concentrations for the test run versus the concentrations in the original material. The results show two major effects from the applied vacuum, namely; significant vaporized components above the operating temperature of 204° C. and the effect of pyrolysis as depicted in an increase the 482° C. Post Test 1 hydrocarbon concentration. Operating the unit under a vacuum increased the fractions and quantities vaporized making the process more energy efficient.

TABLE 3

Hydrocarbon Concentrations of Treated Sample vs. Untreated Sample

| Component | Normal BP ° C. (° F.) | Residual Concentrations mg/kg at 204° C. | Raw Sample Concentrations mg/kg |
|---|---|---|---|
| Decanes | 174.0 (345.2) | 40 | 5700 |
| Undecanes | 194.3 (381.8) | 40 | 9720 |
| Dodecanes | 215.0 (419.0) | 50 | 12600 |
| Tridecanes | 236.0 (456.8) | 90 | 14200 |
| Tetradecanes | 253.0 (487.4) | 260 | 14700 |
| Pentadecanes | 271.0 (519.8) | 720 | 15100 |
| Hexadecanes | 287.0 (548.6) | 1690 | 15100 |
| Heptadecanes | 302.0 (575.6) | 2810 | 13900 |
| Octadecanes | 317.0 (602.6) | 3800 | 12900 |
| Nonadecanes | 331.0 (627.8) | 3970 | 10400 |
| Eicosanes | 343.0 (649.4) | 4040 | 8960 |
| Heneicosanes | 357.0 (674.6) | 3530 | 6950 |
| Docosanes | 369.0 (696.2) | 3250 | 5810 |
| Tricosanes | 380.0 (716.0) | 2420 | 3970 |
| Tetracosanes | 391.0 (735.8) | 1980 | 2910 |
| Pentacosanes | 402.0 (755.6) | 1370 | 1750 |
| Hexacosanes | 412.0 (773.6) | 1240 | 1350 |
| Heptacosanes | 422.0 (791.6) | 960 | 890 |
| Octacosanes | 432.0 (809.6) | 820 | 620 |
| Nonacosanes | 441.0 (825.8) | 890 | 670 |
| Tricotanes | 449.0 (840.2) | 540 | 510 |
| Total | | 34510 | 158710 |

Example 3

Pyrolysis Example

Tests using the equipment described above were conducted to evaluate the degree of metal encapsulation using a carbon binder under pyrolysis process conditions. Analytical leaching tests were conducted to determine the effectiveness of encapsulation.

The pilot plant was operated at a capacity of 45.4 kg/hr (100 lb/hr), for a vacuum pressure of 20.7 kPa (3 psia), with a hot gas recycle flow rate of 10 L/min. Screw rotational speed was 2 rpm and less. The three screw conveyors were configured to operate at the temperatures 204° C. (400° F.) in screw #1, 427° C. (800° F.) in screw #2, and 538° C. (1000° F.) in screw #3.

The results provided in Table 5 show major reduction of the leachable metal from the original material as compared to the material subjected to desorption and encapsulation during pyrolysis. As shown in Table 5, metal encapsulation achieved 2 orders of magnitude reduction for pyrolysis with encapsulation of the following metals.

TABLE 5

Leachable Metals as a Function of Processing Conditions

| Component | Original[A] | Desorption[B] | Encapsulation[C] | Reduction % |
|---|---|---|---|---|
| Aluminum, mg/l | 12 | 0.60 | 0.19 | 98.4 |
| Barium, mg/l | 1.81 | 1.13 | 0.249 | 86.2 |
| Iron, mg/l | 53.57 | 0.339 | 0.082 | 99.8 |
| Titanium, mg/l | 0.60 | 0.011 | 0.003 | 100 |

[A]Raw Sample & Binder, [B]Average Temp = 316° C. (600° F.), [C]Operating Temp = 538° C. (1000° F.)

All publications mentioned in this specification are indicative of the level of skill in the art to which this invention pertains. To the extent they are consistent herewith, all publications mentioned in this specification are herein incorporated by reference to the same extent as if each individual publication was specifically and individually indicated to be incorporated by reference. No admission is made that any cited reference constitutes prior art.

Although the foregoing invention has been described in some detail by way of illustration and example, for purposes of clarity and understanding it will be understood that certain changes and modifications may be made without departing from the scope or spirit of the invention as defined by the following claims.

We claim:

1. A method of thermal remediation of contaminated solid media, comprising:
providing a vacuum housing equipped with at least one hollow shafted screw conveyor having a plurality of openings along its length, said vacuum housing providing two or more separate temperature zones along its length such that the temperature of each successive temperature zone can be maintained at a temperature which is equal to or greater than that of the previous temperature zone;
indirectly and separately heating the two or more temperature zones to temperatures sufficient to volatilize one or more of the contaminants in the contaminated solid media;
feeding the contaminated solid media into the at least one screw conveyor and conveying the contaminated solid media through the vacuum housing with mixing by rotating the at least one screw conveyor;
injecting a hot, inert, non-condensible gas through the plurality of openings in the at least one screw conveyor to directly heat the contaminated solid media in each of the temperature zones to temperatures sufficient to volatilize one or more of the contaminants in the contaminated solid media;
withdrawing the volatilized contaminants and the hot, inert, non-condensible gas from the at least one screw conveyor while holding the contaminated solid media under a vacuum;
maintaining the vacuum on the contaminated solid media;
separating the volatilized contaminants from the non-condensible gas; and
discharging from the vacuum housing solid media reduced in contaminants.

2. The method of claim 1, wherein the vacuum is maintained between about 35 kPa and 0.7 kPa, and wherein a temperature of at least 235° C. is maintained in the at least one screw conveyor.

3. The method of claim 1, wherein the vacuum is maintained between about 20.7 kPa and 0.7 kPa.

4. The method of claim 3, wherein the process is conducted in a vacuum housing equipped with at least two hollow shafted screw conveyors adapted to feed the contaminated solid media sequentially from one to the next, each screw conveyor providing one of the separate temperature zones.

5. The method of claim 3, wherein the process is conducted in a vacuum housing equipped with a first, a second and a third hollow shafted screw conveyor adapted to feed the contaminated solid media sequentially from the first, to the second to the third screw conveyor, each screw conveyor providing one of the separate temperature zones.

6. The method of claim 5, wherein each of the screw conveyors is equipped with twin parallel, intermeshing, hollow shafted screw conveyors, each having a plurality of openings along its length to inject the hot, inert, non-condensible gas.

7. The method of claim 6, wherein the first screw conveyor is heated to a temperature of $\leq 316°$ C.

8. The method of claim 7, wherein the second screw conveyor is heated to a temperature of $>316°$ C. and $\leq 427°$ C.

9. The method of claim 8, wherein the third screw conveyor is heated to a temperature of $>427°$ C. and $\leq 649°$ C.

10. The method of claim 9, wherein an organic binder is added to the third screw conveyor to encapsulate one or more inorganic contaminants.

11. The method of claim 10, wherein the organic binder is one or both of a heavy oil having a carbon value greater than C60, or asphalt.

12. The method of claim 9, wherein the hot, inert, non-condensible gas contains one or both of nitrogen and argon.

13. The method of claim 12, wherein the volatilized contaminants and the hot, inert, non-condensible gas are withdrawn from each of the first, second and third screw conveyors.

14. The method of claim 13, wherein the volatilized contaminants and the hot, inert, non-condensible gas are withdrawn at a plurality of locations along the length of the screw conveyor through a gas manifold.

15. The method of claim 14, wherein the volatilized contaminants and the hot, inert, non-condensible gases are separated by condensation, and wherein the non-condensible portion from the separation is recycled for injection into the first, second and third screw conveyors.

16. The method of claim 15, wherein first, second and third screw conveyors are indirectly heated by electric heating blankets.

17. The method of claim 16, wherein the non-condensible gas is heated prior to injection by heat exchange by passing it adjacent to the electric heating blankets.

18. The method of claim 17, wherein each of the first, second and third screw conveyors is inclined at an acute angle less than 45° from the horizontal in the direction of conveying.

19. The method of claim 18, wherein the angle is between about 1° and 5°.

20. The method of claim 19, wherein the solid media reduced in contaminants is fed into a cooling screw conveyor before being discharged.

21. The method of claim 20, wherein oversize debris is removed from the contaminated solid media before feeding into the vacuum housing.

22. An apparatus for thermal remediation of contaminated solid media, comprising:
- a vacuum housing equipped with at least one hollow shafted screw conveyor adapted to move the contaminated solid media along the length of the vacuum housing, said screw conveyor being formed with a plurality of openings along its length sufficient to introduce a gas, said vacuum housing being partitioned to form two or more separate temperature zones along its length such that the temperature of each successive temperature zone can be maintained at a temperature which is equal to or greater than that of the previous temperature zone;
- means for feeding the contaminated solid media into the at least one screw conveyor;
- means for rotating the at least one screw conveyor so as to convey the contaminated solid media along its length;
- means for indirectly heating the two or more temperature zones to temperatures sufficient to volatilize one or more of the contaminants in the solid contaminated media;
- means for injecting a hot, inert, non-condensible gas through the plurality of openings in the at least one screw conveyor to directly heat the contaminated solid media in each of the temperature zones to temperatures sufficient to volatilize one or more of the contaminants in the solid media;
- means for withdrawing the volatilized contaminants and the hot, inert, non-condensible gas from the at least one screw conveyor and for holding a vacuum on the contaminated solid media;
- means for controlling the rate of injecting the hot, inert, non-condensible gas so as to maintain the vacuum on the contaminated solid media;
- means for separating the volatilized contaminants from the hot, inert, non-condensible gas; and
- means for discharging the solid media from the vacuum housing.

23. The apparatus of claim 22, wherein the vacuum housing, the means for withdrawing the volatilize contaminants and the hot, inert, non-condensible gas, and the means for controlling the rate of injecting the hot, inert, non-condensible gas are capable of maintaining a vacuum in the range of between 35 and 0.7 kPa, and wherein the means for indirectly heating and the means for injecting the hot, non-condensible gas are capable of heating the at least one screw conveyor to a temperature of at least 235° C.

24. The method of claim 23, wherein the vacuum maintained is in the range of between 20.7 and 0.7 kPa.

25. The apparatus of claim 24, wherein the vacuum housing is equipped with at least two hollow shafted screw conveyors adapted to feed the contaminated solid media sequentially from one to the next, each screw conveyor forming one of the separate temperature zones.

26. The apparatus of claim 24, wherein the vacuum housing is equipped with a first, a second and a third hollow shafted screw conveyor adapted to feed the contaminated solid media sequentially from the first, to the second to the third screw conveyor, each screw conveyor forming one of the separate temperature zones.

27. The apparatus of claim 26, wherein each of the screw conveyors is equipped with twin, parallel, intermeshing, hollow shafted screw conveyors, each being formed with a plurality of openings along its length sufficient to inject the hot, non-condensible gas.

28. The apparatus of claim 27, wherein the means for indirectly heating and the means for injecting the hot, non-condensible gas are capable of heating the first screw conveyor to a temperature of $\leqq 316°$ C.

29. The apparatus of claim 28, wherein the means for indirectly heating and the means for injecting the hot, non-condensible gas are capable of heating the second screw conveyor to a temperature of $>316°$ C. and $\leqq 427°$ C.

30. The apparatus of claim 29, wherein the means for indirectly heating and the means for injecting the hot, non-condensible gas are capable of heating the third screw conveyor to a temperature of $>428°$ C. and $\leqq 649°$ C.

31. The apparatus of claim 30, which further comprises means for introducing an organic binder to the third screw conveyor to encapsulate one or more inorganic contaminants.

32. The apparatus of claim 31, wherein the means for withdrawing the volatilized contaminants and the hot, inert, non-condensible gas and for holding a vacuum on the contaminated solid media, and the means for controlling the rate of injecting the hot, inert, non-condensible gas are provided for each of the first, second and third screw conveyors.

33. The apparatus of claim 32, wherein the means for withdrawing the volatilized contaminants and the hot, inert, non-condensible gas and for holding a vacuum on the contaminated solid media includes a gas manifold located at a plurality of locations along the length of each of the screw conveyors.

34. The apparatus of claim 33, which further comprises condensation means for separating the volatilized contaminants and the hot, inert, non-condensible gas, and wherein the apparatus further comprises gas recycle means for recycling the separated portion of the non-condensible gas for injection as the hot, inert, non-condensible gas into each of the first, second and third screw conveyors.

35. The apparatus of claim 34, wherein the means for indirectly heating comprises electric heating blankets on each of the first, second and third screw conveyors.

36. The apparatus of claim 35, which further comprises a plurality of gas conduits adjacent to the electric heating blankets for pre-heating the non-condensible gas prior to injecting it into each of the first, second and third screw conveyors.

37. The apparatus of claim 36, wherein each of the first, second and third screw conveyors is inclined at an acute angle less than 45° from the horizontal in the direction of conveying.

38. The apparatus of claim 37, wherein the angle is between about 1 and 5°, and wherein the first, second and third screw conveyors are arranged in a generally vertical stack.

39. The apparatus of claim 38, which further comprises a cooling screw conveyor adapted to receive the solid media discharged from the third screw conveyor and to cool the media prior to disposal.

40. The apparatus of claim 39, which further comprises screen means for removing oversize debris from the contaminated solid media before feeding into the vacuum housing.

41. The apparatus as set forth in claim 40, mounted on a mobile unit.

* * * * *